Jan. 10, 1928.  1,655,772

A. S. OSBOURNE

COMPRESSOR LUBRICATOR

Filed July 10, 1924

WITNESSES
A.B.Wallach.
C.R. Halbert

INVENTOR
Alfred S. Osbourne
By Winter, Brown & Critchlow
His Attys.

Patented Jan. 10, 1928.

1,655,772

UNITED STATES PATENT OFFICE.

ALFRED S. OSBOURNE, OF INGRAM, PENNSYLVANIA, ASSIGNOR, BY MESNE ASSIGNMENTS, TO CHICAGO LUBRICATOR COMPANY, OF CHICAGO, ILLINOIS, A CORPORATION OF ILLINOIS.

COMPRESSOR LUBRICATOR.

Application filed July 10, 1924. Serial No. 725,263.

This invention relates to lubricators, and particularly to a lubricator associated with fluid compressors or similar power units.

It is an object of the invention to provide a lubricator which is simple in construction, compact, durable, efficient in operation, and which will not easily get out of order.

It is a special object to provide a lubricator which can be readily adjusted to take care of varying operating conditions, which when connected to a compressor to supply lubricant thereto will function to feed the supply only during the actual operation of the compressor, which will promptly and positively initiate flow of the lubricant upon the starting of the compressor and likewise promptly and positively discontinue such flow upon stopping of the compressor and without material lag in respect to the pressure maintained by the compressor, one which while flexible in that it can be set to meet various conditions is extremely sensitive in its action, and one which can be readily set to deliver different quantities of lubricant at predetermined fixed rates unaffected by variations in the discharge pressure maintained by the compressor.

It is another special object to provide a lubricator of such character which comprises a plurality of similarly constructed units so associated as to simultaneously supply lubricant to a number of points either at the same or varying rates, one which is equipped with valve means interposed in the lubricant conveying or supply ducts capable of automatically accommodating themselves to assure a complete cutting off of the lubricant whenever the unit is shut down.

A further special object is to provide a lubricating system for a motor driven compressor enabling the control means for the motor and the means for controlling the flow of lubricant to the compressor to be coordinated so as to function to automatically supply lubricant to the compressor throughout its entire period of operation but not otherwise.

These and other objects of the invention will more fully appear when taken in conjunction with the following description and the appended claims.

Figure 1:
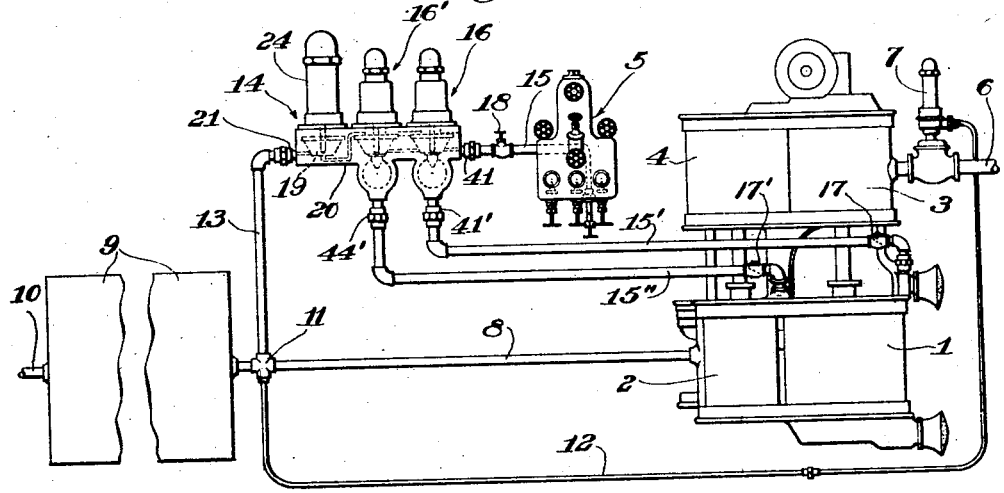
Figure 2:
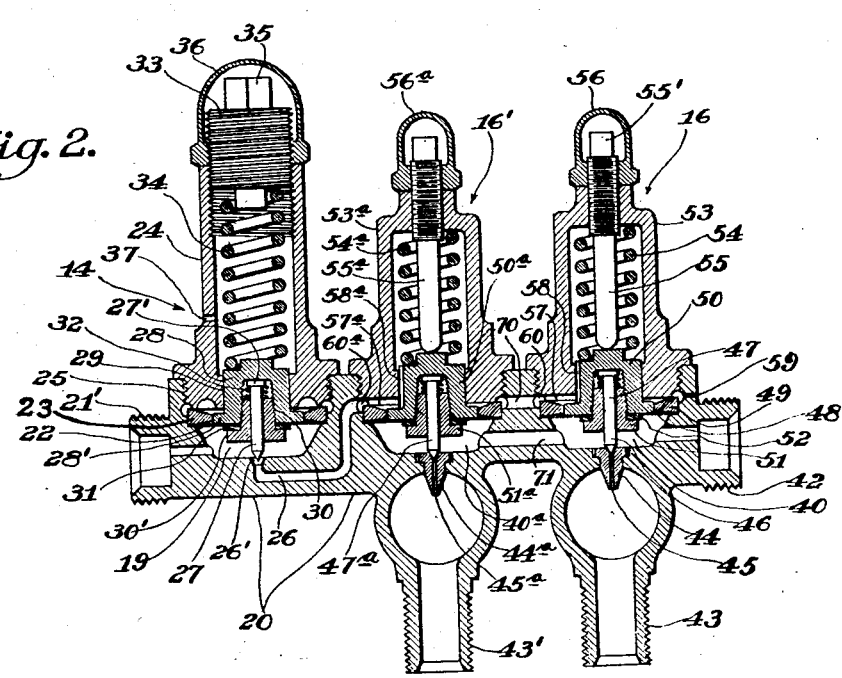

In the drawings, Fig. 1 is a diagrammatic view illustrating a motor driven compressor system equipped with the invention; and Fig. 2 a fragmentary view in section showing the detailed construction of the mechanism for initiating and stopping the flow of the lubricant to the compressor.

As illustrated, the invention is shown as applied to a fluid compressor of the multistage type wherein 1 designates the low pressure stage and 2 the high pressure stage, which are driven by the high and low pressure cylinders 3 and 4, respectively, of a steam engine connected thereto.

Associated with the compressor is a force feed lubricating device of a conventional type designated generally at 5 for supplying the lubricant under pressure, but since this particular device forms no part of the present invention, it need not be described in detail. Ordinarily, the lubricant is supplied from the device 5 under a pressure corresponding to that in the boiler from which the supply of steam for driving the engine 3—4 is taken, the supply of steam for the engine being introduced through the conduit 6 in which is interposed a pressure controlled throttle valve mechanism indicated at 7.

The compressor 1—2 is equipped with the usual discharge pipe 8 which delivers the compressed fluid to the storage tank 9 from which it may be drawn through the delivery conduit 10. Interposed at any convenient point in the discharge pipe 8 is a connection 11 from which leads a branch pipe 12 associated with the pressure controlled mechanism for actuating the throttle valve 7. The control mechanism for the throttle of the engine is of the type adapted to admit steam to the engine cylinders 3—4 whenever the pressure in the discharge of the compressor falls below a predetermined low point, and to cut off the steam supply thereto whenever the discharge pressure has been restored to a predetermined maximum.

Another branch pipe 13 leads from the connection 11 and establishes communication between the compressor discharge and the pressure chamber of a pressure-actuated control head indicated generally at 14. A conduit 15 conducts lubricant from the device 5 to the lubricant receiving chambers of a pair of lubricant regulating heads designated at 16 and 16', branches 15', 15", leading from the outlet openings of the lubricant receiving chambers of these respective heads to the low pressure and high pressure stages 1 and 2, respectively, of the compressor, all as clearly illustrated in Fig. 1 of the drawings. Interposed in the branch 15' connected to the low pressure stage of the compressor is a non-return or check valve 17, and likewise interposed in the branch 15'' in advance of the high pressure stage 2 of the compressor is a non-return valve 17'. The non-return valves 17 and 17' serve to effectively prevent the back flow of lubricant and the escape of air from the compressor towards the regulating heads 16, 16'. If desired, the conduit 15 may be provided with a cut off valve 18 at a point between the device 5 and the regulating heads.

The pressure chamber of the control head 14 is designated at 19, pressure fluid being delivered thereto through the pipe 13 connected to the valve block 20 in which the chamber 19 is located by means of a union 21 threadedly engaging the projecting nipple 21'. One side of the pressure chamber 19 is formed by a movable imperforate diaphragm 22 seated at its periphery upon a shouldered portion at one side of the chamber 19 which is surmounted by a guiding and sealing annulus 23, the annulus being forcibly pressed against one side of the diaphragm by means of the inner end of a cap 24 threadedly engaging an internally threaded bore in the valve block forming a continuation of the chamber 19, as indicated at 25.

A fluid conducting passageway or duct 26 leads from the side of the chamber 19 opposite the diaphragm 22 through the body of the block, and establishes communication with the leakage or venting chamber of the regulating head 16', as will be described subsequently more in detail. The inlet to the duct 26 is shaped as indicated at 26' to form a valve seat which is adapted to cooperate with the lower extremity of a needle valve 27. The needle valve 27 is carried by the movable diaphragm 22, and is suspended in operative position by means of a backing block 28 having an enlarged portion 28' directly abutting the upper face of the diaphragm and slidingly fitting within the bore of the annulus 23. The main body of the block 28 slidingly fits within a bore at the lower end of the cap 24, in the manner indicated at 29. The backing block is also provided with a centrally disposed recess in which is threadedly fitted the nut 30 having the flanged extremity 30' and a longitudinal bore through which the needle valve 27 projects. The flanged portion 30', when the nut is screwed home is adapted to clamp the diaphragm between it and the lower face of the block 28, and ordinarily a washer 31 is interposed between the flange 30' and the diaphragm.

The relative proportions of the nut 30 and the recess within the backing block 28 are such that the recess is not completely filled after the nut has been screwed home but provides sufficient room for the headed extremity 27' of the needle valve and a small coiled spring 32 encircling the stem of the valve and interposed between the head 27' and the adjacent face of the nut 30.

Resting at one end upon the backing block 28 and at its other end upon an adjusting nut 33 threaded into the upper portion of the cap 24 is a compression spring 34, serving to urge the diaphragm 22 downwardly and the needle valve 27 carried thereby to its closed condition, preventing the passage of pressure fluid delivered to the pressure chamber 19 through the passageway or duct 26. By adjusting the position of the nut 33 within the cap, the tension of spring 34 may be varied in an obvious fashion. In order that the nut may be readily adjusted, it is provided, at its upper end with a polygonal extension 35 which may be engaged by a wrench, but in order to prevent tampering therewith, this portion is ordinarily covered by means of a top piece 36 threadably engaging the body of the nut. The interior of the cap 24 is placed in free communication with the atmosphere by means of an aperture 37.

The conduit 15 conducts lubricant from the supply device 5 to the lubricant receiving chamber 40 of the regulating head 16, being connected to the opposite end of the valve block 20 from the point of connection of the conduit 13 by means of a union 41 which is threadably engaged with the nipple 42, in a manner similar to that previously described in connection with the conduit 13.

Depending from the regulating head 16 immediately below the lubricant receiving chamber 40 is a nipple 43 which is connected to the branch 15' by means of the union 41'. Anchored within the body of the block 20 at a point between the chamber 40 and the nipple 43 is a nozzle 44 provided with a longitudinal duct 45 shaped to form a valve seat adjacent the chamber 40 as indicated at 46. The valve seat 46 is adapted to cooperate with the lower tapered end of a needle valve 47 carried by a movable abutment in the form of a flexible diaphragm 48 forming one wall of the chamber 40.

The diaphragm 48 is anchored within a bore forming a continuation of the chamber 40 by means of an annulus 49 corresponding in all respects to the annulus 23, previously described. The valve 47 is likewise connected to the diaphragm 48 by means of a backing block 50, a nut 51 anchored in a central recess in the block, and an interposed washer 52, all in a manner similar to the construction of the control valve already described.

The cap portion 53 of the regulating head 16 forms a closed casing which houses a coiled compression spring 54 abutting at its lower end the backing block 50 and at its upper end against a shouldered portion of the top of the cap, and surrounds an adjustable limiting stop 55 adjustably threaded through the top of the cap. The limiting stop 55 is equipped with a squared end 55' adapted to be engaged by a wrench so as to vary the position of its lower extremity for limiting the opening movement of the valve 47 to any desired extent. The squared end 55' is housed within a removable top piece 56 to prevent tampering with the limiting stop after adjustment.

A space is provided between the lower threaded extremity of the cap 53, the annulus 49 and the enlarged portion of the backing block 50 in contact with the diaphragm 48, as shown at 57, which space is placed in communication with the interior of the cap 53 by means of the duct 58, or alternatively by the provision of a backing block 50 which loosely fits within the bore at the lower extremity of the cap so as to provide room for leakage from the space 57 to the interior of the cap. The space 57 together with the space within the interior of the cap 53 forms a leakage or venting chamber which is placed in communication with the atmosphere through the restricted port 59, flow from the venting chamber to the restricted port being facilitated by means of the annular passageway 60.

The regulating head 16' is identical in construction with the regulating head 16, being provided with the depending nipple 43' connected to the branch 15'' by means of the union 44'. The details of the valve mechanism used in connection with the regulating head 16' therefore need not be described in detail, corresponding parts being designated by the same reference numerals previously used in describing the regulating head 16 but with an attached exponent "a"

The passageway 26 communicates directly with the annular passageway 60$^a$ of the regulating head 16' and the annular passageways 60 and 60$^a$ are placed in communication by means of the short duct 70. The lubricant receiving chambers 40 and 40$^a$ are likewise placed in communication by means of a passageway or duct 71.

Due to the provision of the small compression spring 32, the needle valve 27 is permitted to adjust itself automatically to its seat 26' within the limits permitted by the free play provided between the valve stem and the bore through the nut 30, and likewise the needle valves 47 and 47$^a$ accommodate themselves to the valve seats provided in the nozzles 44 and 44$^a$ in the same manner.

In use, the valve 27 is normally seated to prevent flow from the pressure chamber 19 through the passageway 26 to the lubricant regulating heads, and the tension of the compression spring 34 is adjusted so that the valve 27 will be unseated at the same pressure in the discharge pipe 8 at which the control means 7 will function to close the throttle valve of the motor, and will be reseated whenever the pressure in the discharge of the compressor falls to a point to actuate the throttle valve 7 to start the motor 3—4. For this reason, the pipes 12 and 13 connected to the throttle valve control means and the control head 14, respectively, are led from the common connection 11.

Assuming the pressure in the discharge line 8 to fall sufficiently to open the throttle valve to the engine and coincidently therewith to permit the closing of the valve 27, any pressure fluid previously admitted to the space above the diaphragms 48$^a$ and 48 will escape through the port 59 and permit the pressure of the lubricant constantly supplied to the lubricant receiving chambers 40 and 40$^a$ to open the valves 47 and 47$^a$, and feed lubricant to the two stages of the compressor through the branches 15' and 15''. As long as the pressure at the discharge line 8 remains below that for which the spring 34 and the regulating tension means in the valve control 7 have been adjusted, lubricant will be supplied through the conduit 15 and the branches 15' and 15'' in this manner.

As soon as the discharge pressure in the line 8 reaches the predetermined height for which the spring 34 has been set, the needle valve 27 will be opened, permitting pressure fluid to flow from the pipe 13 to the passageway 26 and in turn to the space above the diaphragms 48 and 48$^a$, consequently forcing the valves 47 and 47$^a$ to their seats and cutting off further flow of the lubricant to the compressor.

By properly coordinating the tension of the spring 34 with the tension means used in connection with the throttle control valve means 7, it is apparent that the opening and closing of the valves 47 and 47$^a$ may be effected upon the starting and stopping of the driving motor for the compressor, and due to the relative proportions of the parts providing free flow through the several passageways and ducts of the valve mechanism, will immediately effect actuating the needle valves controlling the flow of the lubricant whenever the valve 27 of the control head is moved either to its opened or closed position. In this manner, flow of lubricant to the compressor is initiated in a positive manner upon the starting of the driving motor, and likewise discontinues such flow promptly and positively upon the stoppage of the motor and compressor.

The rate at which the lubricant is fed from the conduit 15 to the branches 15' and 15'' may be suitably varied by properly adjusting the limiting stops 55 and 55$^a$, which determine the degree of opening movement of the valves 47 and 47ᵃ. Because of the independence of the adjusting means for the two regulating heads 16 and 16', it is apparent that the rate of flow of the lubricant to the two stages of the compressor may be varied to suit the operating conditions thereof and irrespective of the starting and stopping of the flow of the lubricant.

The invention has been particularly described as embodied in a compressor having two stages, and consequently two regulating heads 16 and 16' have been shown. It is obvious, however, that any number of stages may be used, the number of regulating heads varying in accordance therewith, the several regulating heads being arranged in series in the same manner as the two heads 16 and 16', with the head of the series directly connected to the conduit 15 provided with a leakage port corresponding to the port 59.

It is also obvious that although the lubricator has been particularly described as used in connection with a compressor system, it may be used in conjunction with any similar power unit for delivering lubricant to a plurality of points.

A feature of great practical importance is the ready interchangeability of the various parts of the valve mechanisms, as will be obvious from an inspection of Fig. 2 of the drawings. This feature not only extends to the use of the parts in the control and regulating heads 14, 16, and 16', but likewise to the pressure controlled throttle valve mechanism 7, many of the parts of which may be designed to correspond to those employed in the said heads.

Although the invention has been illustrated and described in connection with the preferred embodiment thereof, as required by the patent statutes, it is obvious that many changes in details as well as in the arrangement of parts may be made without departing from the spirit of the invention, and it is therefore not intended to limit the invention beyond that particularly pointed out and defined by the appended claims.

I claim:

1. The combination of a motor, a compressor driven thereby, means for starting and stopping the motor in response to predetermined low and high pressure conditions of the fluid delivered by the compressor, means for supplying lubricant under pressure, a conduit for conducting lubricant from said means to the compressor, a regulating head interposed in said conduit including a casing having a movable diaphragm dividing the casing into two chambers disposed at the opposite sides thereof, one of said chambers receiving the lubricant from the supply means, a valve carried by the diaphragm for controlling the flow of the lubricant from said lubricant receiving chamber to the compressor, said diaphragm being continually subjected to the pressure of the lubricant in the receiving chamber whereby tending to urge the said valve to its open condition, and means responsive to the compressor discharge pressure when it reaches a predetermined point for admitting pressure fluid to the chamber opposite the lubricant receiving chamber whereby to close the said valve.

2. The combination of a motor, a compressor driven thereby, means for starting and stopping the motor in response to predetermined low and high pressure conditions of the fluid delivered by the compressor, means for supplying lubricant under pressure, a conduit for conducting lubricant from said means to the compressor, a regulating head interposed in said conduit including a casing having a movable diaphragm dividing the casing into two chambers disposed at the opposite sides thereof, one of said chambers receiving the lubricant from the supply means, a valve carried by the diaphragm for controlling the flow of the lubricant from said lubricant receiving chamber to the compressor, said diaphragm being continually subjected to the pressure of the lubricant receiving chamber whereby tending to urge the said valve to its open condition, means for conducting pressure fluid to the chamber opposite the lubricant receiving chamber, a normally closed control valve for governing admission of the pressure fluid to the said chamber, and means responsive to the pressure at the discharge end of the compressor for opening the control valve to admit pressure fluid to the said chamber whenever the discharge pressure reaches a predetermined height.

In testimony whereof, I sign my name.

ALFRED S. OSBOURNE.